United States Patent [19]

Pierrat

[11] 4,293,012
[45] Oct. 6, 1981

[54] LOG SPLITTER WITH OVERLOAD PROTECTION

[76] Inventor: Michel A. Pierrat, 48 Farrwood Dr., Andover, Mass. 01810

[21] Appl. No.: 53,198

[22] Filed: Jun. 29, 1979

Related U.S. Application Data

[63] Continuation-in-part of Ser. No. 873,060, Jan. 27, 1978, abandoned.

[51] Int. Cl.³ .................................................. B27L 7/00
[52] U.S. Cl. ............................... 144/193 A; 254/93 H
[58] Field of Search .......... 144/193 R, 193 A, 193 C, 144/193 D; 254/93 H, 104

[56] References Cited

U.S. PATENT DOCUMENTS

| | | | |
|---|---|---|---|
| 2,018,506 | 10/1935 | Walker | 254/93 H |
| 2,851,072 | 9/1958 | Gerjets et al. | 144/193 A |
| 3,285,304 | 11/1966 | Fuller | 144/193 A |
| 3,982,572 | 9/1976 | Kontendick | 144/193 D |
| 4,102,373 | 7/1978 | Winiasz | 144/193 A |

Primary Examiner—W. D. Bray
Attorney, Agent, or Firm—E. Thorpe Barrett

[57] ABSTRACT

A log splitter with automatic overload protection that prevents the log splitter structure from being damaged by accidental overload. A low-mass rapid-response pressure relief valve is incorporated in the pump side of a hydraulic jack, which produces the splitting force, so that the pressure that can be applied to the jack plunger is limited, but the load that can be supported by the jack is not so limited. The hydraulic jack has applications apart from the log splitter.

6 Claims, 7 Drawing Figures

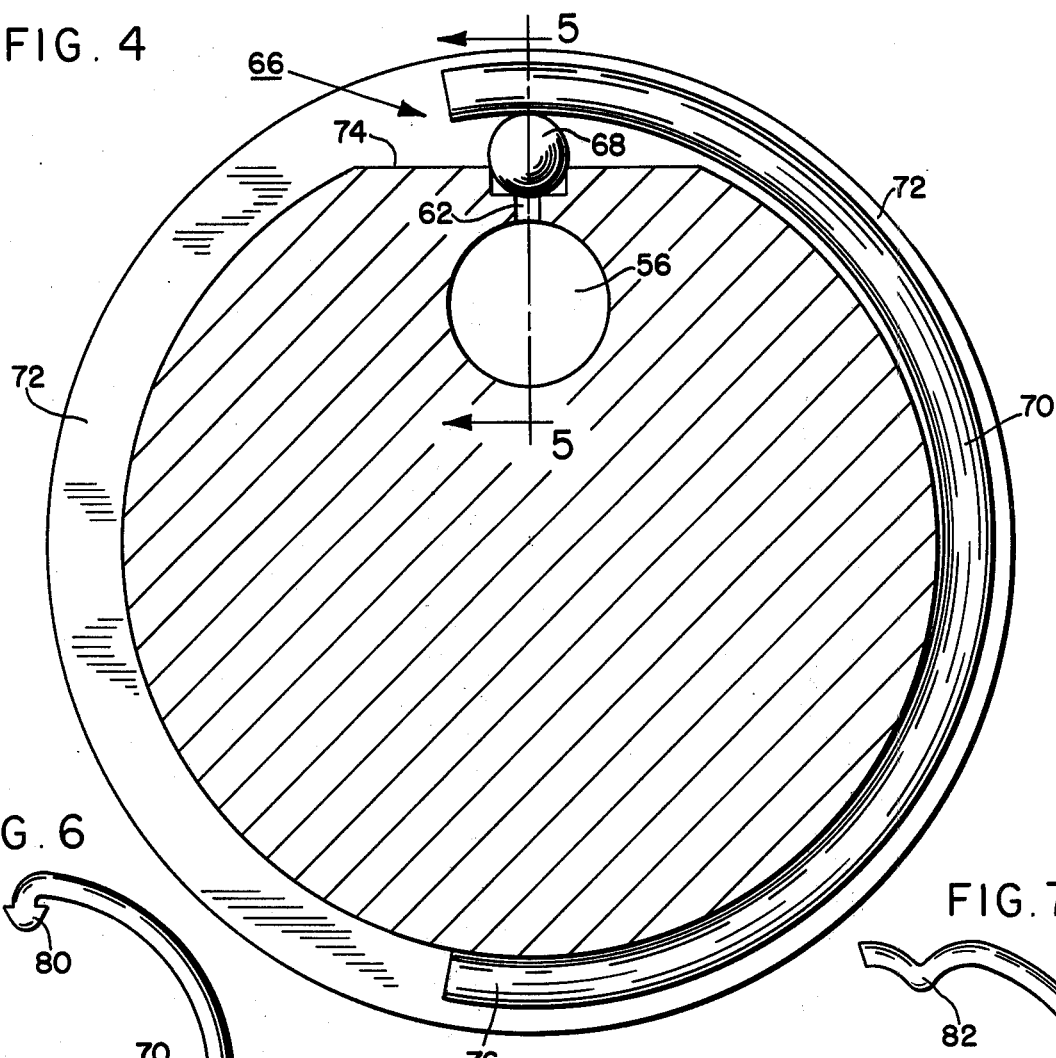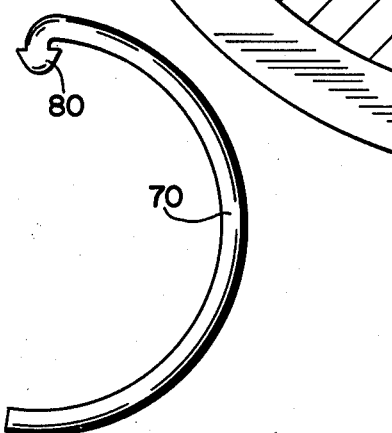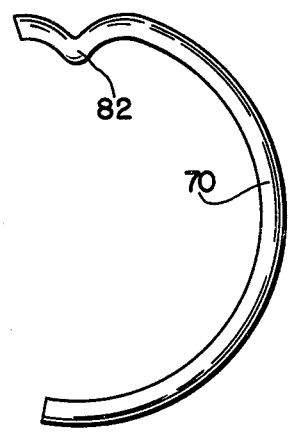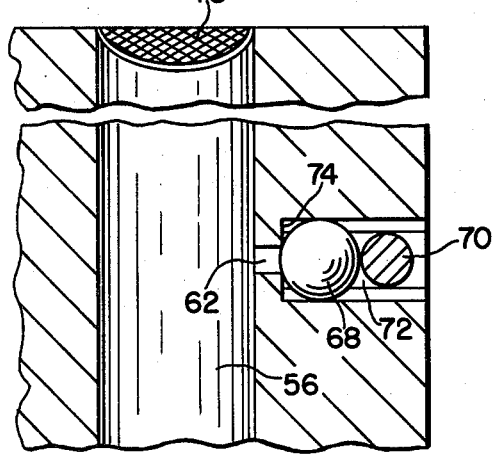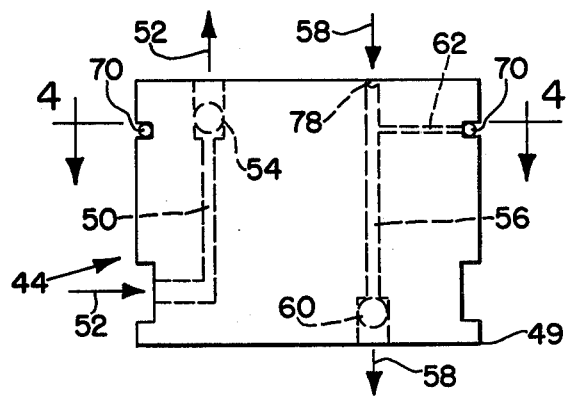

LOG SPLITTER WITH OVERLOAD PROTECTION

This application is a continuation-in-part of my copending application entitled LOG SPLITTER, Ser. No. 873,060, filed Jan. 27, 1978, now abandoned. Reference is made to my copending application entitled LOG SPLITTER WITH IMPROVED CLAMP filed of even date herewith.

This invention relates to log splitters and more particularly to a log splitter incorporating automatic overload protection and to a hydraulic jack forming part of the log splitter and having other applications apart from the log splitter.

A practical log splitter, even one intended for home use, must develop large splitting forces, a force of ten or more tons being highly desirable. It is difficult, however, to provide anything like precision control of the applied forces and if the force applied is too great, the frame or other parts of the log splitter may be broken or deformed: if the force is limited to a value too low, the log splitter may not be effective for its intended purpose. Thus, it is important to allow the log splitter to operate near the safe maximum force while protecting it from damage caused by accidental overloading. The protection device must have a rapid response time, so that the application of force is interrupted before damage can occur, and it is important also that the device operate within close tolerances from the preset safety limit so that maximum splitting forces can be achieved without danger of damage to the log splitter.

It is an object of this invention to provide a log splitter having a hydraulic control that can be preset to be actuated at a relatively precise and predictable limit force to prevent the accidental application of higher forces to the log splitter structure.

Moreover, it is desirable that such a load limit device, when triggered, not depressurize the high pressure compartment that supports the load plunger or reduce the forces already applied to the plunger. Such a protection device enables the plunger of the jack to support a force in excess of the preset load limit while preventing operation of the pump from increasing the pressure applied to the jack plunger.

It is, accordingly an object of the invention to provide a log splitter having automatic protection against the application of pressures greater than the preset maximum by operation of the pump while not limiting the capacity of the hydraulic plunger to sustain any directly or pre-applied load.

These and other objects will be in part pointed out in and in part apparent from the following description of a preferred embodiment of the invention considered in conjunction with the accompanying drawings, in which:

FIG. 3 is a diagrammatic view of the control valve unit for the hydraulic jack of FIG. 2;

FIG. 4 is an enlarged sectional view taken along line 4—4 of FIG. 3;

FIG. 5 is a partial view taken along line 5—5 of FIG. 4;

FIG. 6 is a diagrammatic view of another and preferred form of pressure limiting element for use in the jack of FIG. 2; and FIG. 7 is a diagrammatic view of another form of the pressure limiting element shown in FIG. 6.

The general construction of the log splitter is similar to that shown in the above-identified copending application, Ser. No. 873,060, and now abandoned.

Figure 1:
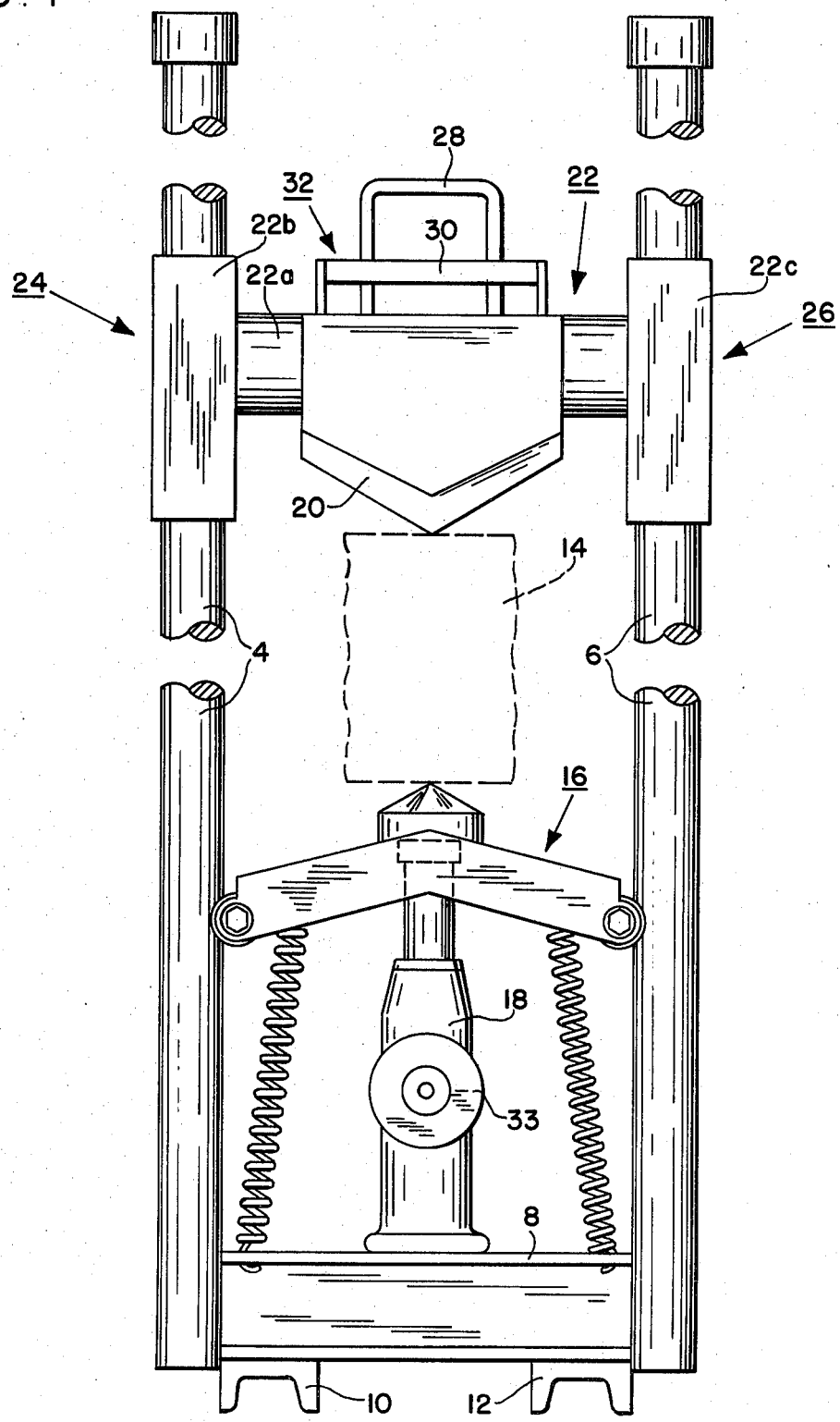
FIG. 1 is a front view of a log splitter in which the invention is embodied.
Figure 2:
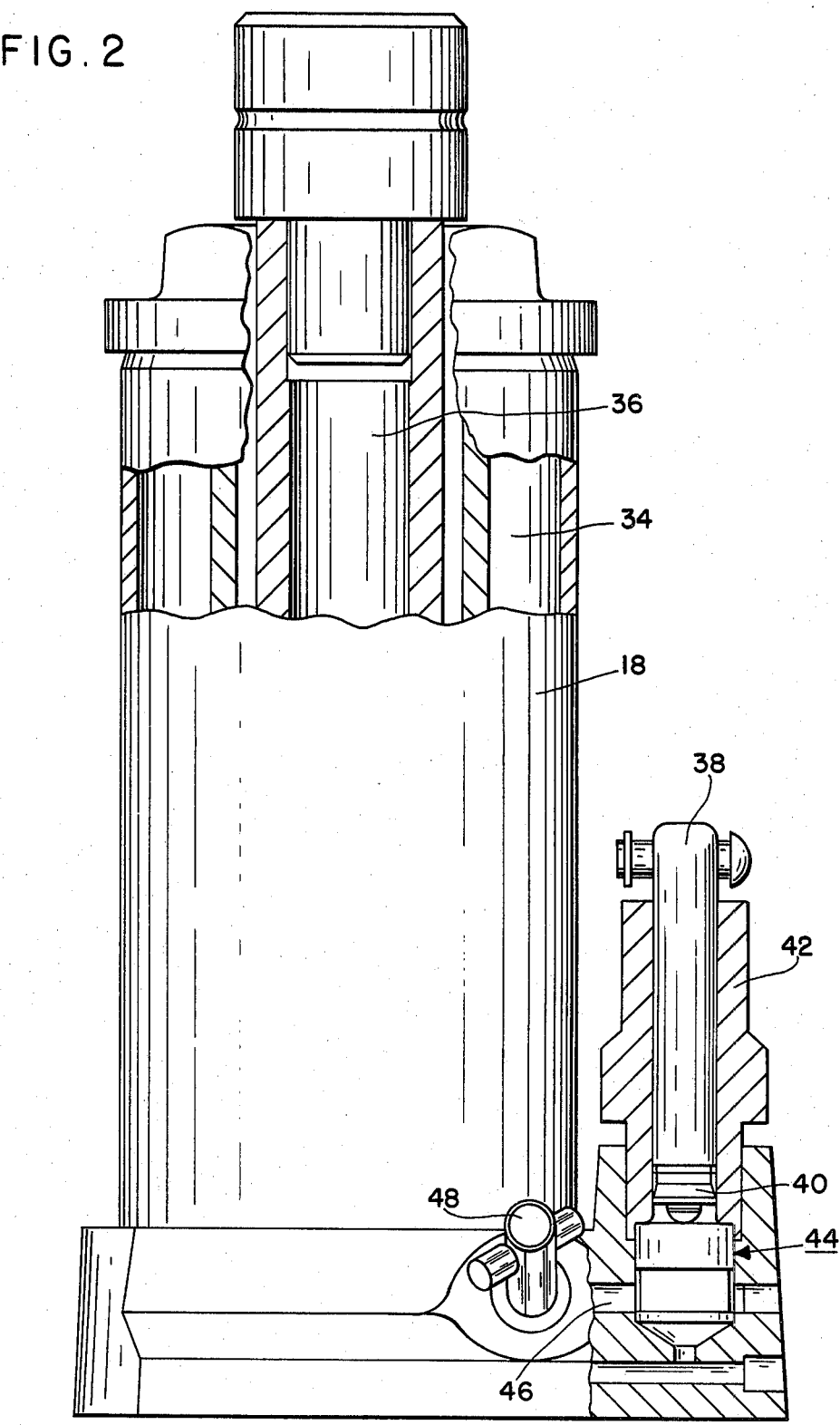
FIG. 2 is a front view, partly in section, showing the hydraulic jack incorporated into the log splitter of FIG. 1.

As shown in FIG. 1, the log splitter includes a pair of spaced parallel upright guide members 4 and 6, which may be formed of steel pipe or other material having the requisite strength, that are supported by a base 8 formed of a steel I-beam that extends between and is welded at either end to the members 4 and 6. The base 8 is in turn supported by a pair of spaced parallel lengths 10 and 12 of channel iron that are welded to and extend perpendicularly from the base 8. To support the lower end of a log to be split, indicated in outline at 14, a support and moment-limiting mechanism, generally indicated at 16, extends between the guide members 4 and 6 and rests on top of a hydraulic jack, generally indicated at 18, that provides the force for the splitting action. A carriage assembly, generally indicated at 22, which extends between and is slidably mounted on the guide members 4 and 6, includes a carriage member 22a of circular cross section, a downwardly depending splitting wedge 20 and two brackets 22b and 22c that respectively house two quick-release clamping assemblies, generally indicated at 24 and 26. These components are welded solidly together to form the carriage assembly 22. In operation, the carriage assembly 22 is released from the guide members 4 and 6 by grasping a movable handle 28 and a fixed handle 30 of a hand-operated clamp actuator, generally indicated at 32, and squeezing to move the handle 28 toward the fixed handle 30. By means of the same two handles, the carriage assembly 22 can be lifted upwardly to a position that will allow the log 14 to be placed on the support 16. The pressure on the actuator 32 is then released allowing the clamps 24 and 26 to re-engage the guide members 4 and 6 and hold the carriage assembly in that position. The operator then places the log on top of the support 16 and holds it in position with one hand while with the other he releases the clamps 24 and 26 by squeezing the actuator 32 and lowers the carriage assembly 22 until the wedge 20 is in firm engagement with the log. The actuator 32 is then released and the clamps 24 and 26 engage the guide members 4 and 6 to prevent upward movement of the carriage assembly 22. The jack 18 is then actuated by applying power to an electric motor, generally indicated at 33, to force the support 16 and the log 14 upwardly so that the wedge 20 penetrates and splits the log. It is important that the clamping mechanism be continuously adjustable so that it can be clamped at any position along the guide members in order that the wedge can hold the log in position when the actuator 32 is released. Such an arrangement permits the use of a jack with a shorter stroke than would otherwise be required, an important consideration when large forces are involved. As stated above, a practical log splitter must be capable of exerting large forces on the log, of the order of 10 or 12 tons, and this requirement places stringent demands on the construction of the splitter. To provide a structure capable of withstanding the necessary forces without damage, a very large heavy structure must be provided or care must be taken both to minimize and limit the twisting moments that the frame must carry and to limit the total force that can be applied to the frame and to the clamping mechanism. In addition, the clamps 24 and 26 must be able to resist this large splitting force without giving way, yet must be light enough to be lifted, along with the carriage assembly 22, with one arm. For practical use, the clamp release actuator may be one that can be formed by a series of locking plates arranged to be inclined so that the opposite edges of a central opening through each plate engage opposite sides of a guide member extending through the opening. With this arrangement, as force is applied to the clamp by the splitting action, the gripping force exerted on the guide members increases, providing an effective bar to movement of the clamp. Such a clamp having a locking force responsive to the applied pressure, that is, the greater the force required to split the log the greater the clamping force, can be both light in weight and easily operated. A preferred clamp of that type is described in more detail in my co-pending application titled LOG SPLITTER WITH IMPROVED CLAMP, Ser. No. 053,199, filed of even date herewith.

The jack 18 that is used in the log splitter may be a conventional hydraulic automobile jack that is modified as described below to limit the maximum force that can be produced by the jack.

The jack includes the usual low pressure sump or reservoir 34 and a plunger 36 that is pushed upwardly by the pressure of the hydraulic fluid. In operation, a piston 38 of small diameter, provided with the usual packing 40, is reciprocated in a cylinder 42 to pump hydraulic fluid from the low pressure reservoir 34 into the high pressure compartment that communicates with the plunger 36. A valve control unit, generally indicated at 44, is arranged by means of internal ball valves so that as the piston 38 is withdrawn to create a vacuum, the hydraulic fluid flows through a passageway 46 from the low pressure reservoir 34 into the cylinder 42. Upon the return stroke of the piston 38, the fluid is forced through the valve unit 44 into a passageway 46 that communicates with the high pressure compartment in the cylinder that carries the load plunger 36. Continued operation of the piston 38 causes the plunger 36 to extend upwardly and produce the splitting action. At the end of the stroke, the hydraulic pressure is released by means of a hand or foot-operated control, indicated diagrammatically at 48, that opens a valve to permit the fluid to return from the high pressure compartment beneath the plunger 36 to the low pressure reservoir 34.

The reciprocating motion of the piston 38 may be produced by foot action in the usual manner of a foot-operated jack or it may be produced by an electric motor or other source of power coupled to the piston 38 by a suitable speed-reduction and cam mechanism. A suitable drive mechanism is described in the above-referenced patent application Ser. No. 873,060.

The operation of the valve control unit 44 is diagrammatically illustrated in FIG. 3. The bottom edge 49 of that unit forms a seal between the low and high pressure areas of the pump. When the piston 38 is withdrawn, the hydraulic fluid from the low pressure reservoir is drawn through a passageway 50, as indicated by the arrows 52, into the cylinder 42. When the piston 38 is returned to apply pressure to the hydraulic fluid, the passageway 50 is closed by a ball valve 54 and the fluid is forced through a passageway 56, as indicated by the arrows 58, into the high pressure compartment. Return flow from the high pressure compartment into the cylinder 42 is prevented by a ball valve 60.

The hydraulic jack described to this point may be a conventional automobile jack, preferably one capable of handling a load of 10 tons or more.

In order to limit the force that can be applied to the plunger 36, a small passageway 62 is connected to the passageway 56 and arranged to bleed the fluid directly into the low pressure reservoir whenever the pressure in the passageway 56 exceeds some preset limit.

The enlarged view of FIG. 4 illustrates the operation of a pressure relief valve, generally indicated at 66. The passageway 62 is isolated from the low pressure reservoir by the ball valve 66 which includes a steel ball 68 that is pressed against a seat formed by the orifice at the end of the passageway 62 by a wire spring 70 positioned in a groove 72 extending around the valve control unit 44. A flat surface 74 in the bottom of the groove 72 permits the spring 70 and ball 68 to be entirely contained within the groove 72. The spring 70 presses the ball against the end of the passageway 62 with a predetermined force that controls the load limit of the jack. If the pressure in the cylinder 42 exceeds the preset value, the pressure of the hydraulic fluid forces the ball 68 away from its seat and allows the fluid to flow to the outside of the valve control unit 44 and return to the low pressure reservoir. Because of the high pressure at the time of release, the hydraulic fluid escaping from the passageway 62 will be atomized into a fine mist. Once the critical pressure is reached, no increase in force is applied to the plunger 36 and the application of destructive forces to the log splitter is prevented.

With the construction described, the force that can be applied to the plunger 36 by operation of the piston 38 is limited to the critical value, but no such limit is imposed on the plunger 36 directly. Thus, if downward forces are generated greater than those developed by the pumping action of the piston 38 and applied by the log splitter, or other load, to the plunger 36, the plunger will not retract because the pressure relief valve 66 is isolated by the ball valve 60 from the hydraulic fluid driving the plunger 36.

The desired pressure relief is achieved by bypassing only a small quantity of hydraulic fluid and the passageway 62 and the ball 68 may be quite small. The ball 68 may have a diameter, for example, of 0.0625 inches and the diameter of the passageway 62 may be only 0.02 inches. The wire spring 70 may be formed of piano wire with a diameter of 0.039 inches. The groove 72 may have a vertuical width of 0.064 inches. With an internal groove diameter of 0.625 inches, the diameter of the spring wire 70 in free state may be about 0.56 inches. This diameter may be adjusted to provide the desired relief pressure and, once set, the value remains substantially constant. The wire 70 is shaped so that it makes contact with the base of the groove 70 only at the end 76, and at its other end makes contact only with the ball 68. The small diameter of the passageway 62 makes it important that dirt or other particles in the hydraulic system be prevented from entering and clogging the passageway 62. For this reason, a fine metal screen 78 is staked in position at opening into the passageway 56.

The hydraulic fluid may be subjected to pressures of several thousand pounds per square inch when the relief valve operates, which will be when the piston 38 is nearing the end of its pressure stroke. The response to the excessive pressure must be immediate and the pressure relief must be substantially instantaneous. It is therefore important that the mass of the moving parts in the relief system be kept to a minimum.

The use of a ball 68 is a satisfactory method for limiting the pressure, but the tiny ball is somewhat difficult to handle and is easily lost when the unit is disassembled. The ball 68 may be eliminated by cold forming a taper 80 directly on the end of the wire 70, as shown in FIG. 6. The taper 80 seals the end of the passageway and eliminates the need for the ball. Alternatively, (FIG. 7) the wire may be flattened slightly and swaged to form a sealing element 82 on the side of the wire 70 which replaces the ball in sealing the orifice at the end of the passageway 62.

From the foregoing description of the best embodiment of my invention known to me, it will be seen that the log splitter embodying the invention is practical in all respects and that the use of a specially-modified automobile jack has many advantages. It will be apparent also that the modified hydraulic jack can find uses entirely apart from the log splitter and that it can be readily modified to meet the particular requirements of each condition of use.

What is claimed is:

1. In a log splitter comprising first and second guide members, means supporting said guide members in spaced parallel relationship, a support positioned between said guide members for supporting a log to be split, a carriage extending between said guide members, and a splitting wedge carried by said carriage, the improvement comprising drive means for moving said support into closing relationship with said wedge including a hydraulic jack having a supply of hydraulic fluid, a high pressure compartment, a one-way valve communicating with said high pressure compartment and arranged to permit the flow of hydraulic fluid into said high pressure compartment, a low pressure reservoir, a cylinder communicating with said one-way valve, a piston in said cylinder, arranged to pump said fluid from said low pressure reservoir through said one-way valve into said high pressure compartment, and pressure-responsive relief valve means communicating with said cylinder at a point on the side of said one-way valve opposite from said high pressure compartment and arranged to permit the flow of said fluid from said cylinder into said low pressure reservoir whenever the pressure in said cylinder exceeds a predetermined level.

2. Apparatus as claimed in claim 1 wherein said relief valve means includes a passageway connecting with said cylinder and having a terminating orifice, a sealing member, and an arcuate spring member biasing said sealing member into engagement with said orifice.

3. Apparatus as claimed in claim 1 wherein said relief valve means includes a passageway communicating with said cylinder and having a terminating orifice, and an arcuate spring member having an integral sealing surface portion pressed into engagement with said orifice.

4. In a hydraulic jack having a high pressure compartment, a low pressure reservoir, a cylinder, a supply of hydraulic fluid, a piston in said cylinder arranged to pump hydraulic fluid from said low pressure reservoir into said high pressure compartment, first one-way valve means communicating with said high pressure compartment and arranged to permit the flow of said fluid from said cylinder into said high pressure compartment and to prevent the flow of said fluid in the reverse direction, and second one-way valve means arranged to permit the flow of said fluid from said low pressure reservoir into said cylinder and to prevent the flow of said fluid in the reverse direction, the improvement comprising a pressure-responsive spring-biased relief valve communicating with said cylinder at a point on the side of said first one-way valve opposite from said high pressure compartment and responsive to a predetermined fluid pressure in said cylinder and arranged to bypass said second one-way valve means to permit the flow of said fluid from said cylinder into said low pressure reservoir.

5. Apparatus as claimed in claim 4 wherein said relief valve includes a passageway communicating with said cylinder and having a terminating orifice, a sealing member, and an arcuate spring member biasing said sealing member into engagement with said orifice.

6. Apparatus as claimed in claim 4 wherein said relief valve includes a passageway communicating with said cylinder and having a terminating orifice, and an arcuate spring member having an integral sealing surface portion pressed into engagement with said orifice.

* * * * *